US009830525B1

(12) United States Patent
Sieracki

(10) Patent No.: US 9,830,525 B1
(45) Date of Patent: *Nov. 28, 2017

(54) METHOD AND SYSTEM FOR PARALLACTICALLY SYNCED ACQUISITION OF IMAGES ABOUT COMMON TARGET

(71) Applicant: Jeffrey M. Sieracki, Silver Spring, MD (US)

(72) Inventor: Jeffrey M. Sieracki, Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,067

(22) Filed: Feb. 27, 2017

Related U.S. Application Data

(63) Continuation of application No. 14/218,573, filed on Mar. 18, 2014, now Pat. No. 9,581,431.

(60) Provisional application No. 61/802,110, filed on Mar. 15, 2013.

(51) Int. Cl.
  *G06K 9/00* (2006.01)
  *G06K 9/46* (2006.01)
(52) U.S. Cl.
  CPC ....... *G06K 9/4604* (2013.01); *G06K 9/00664* (2013.01)
(58) Field of Classification Search
  CPC ............ G06K 9/4604; G06K 9/00664; G01B 11/005; H04N 1/2112
  USPC ......................................................... 348/135
  See application file for complete search history.

(56) References Cited

U.S. PATENT DOCUMENTS

| 6,346,938 B1 | 2/2002 | Chan et al. |
| 7,225,548 B2 | 6/2007 | Sieracki et al. |
| 8,172,139 B1 | 5/2012 | McDonald et al. |
| 8,213,749 B2 | 7/2012 | Di Bernardo et al. |
| 8,396,685 B2 | 3/2013 | Mahajan |
| 8,497,981 B2 | 7/2013 | Mahajan |
| 8,624,725 B1 * | 1/2014 | MacGregor ........... H04W 4/026 340/539.13 |
| 8,625,902 B2 | 1/2014 | Baheti et al. |

(Continued)

FOREIGN PATENT DOCUMENTS

JP 2011-040962 A 2/2011

*Primary Examiner* — Zhihan Zhou
(74) *Attorney, Agent, or Firm* — Rosenberg, Klein & Lee

(57) ABSTRACT

A method and system are provided for parallactically synced acquisition of images about a common target from mutually displaced imaging positions. At least first and second imaging devices are disposed respectively at first and second imaging positions. The first imaging device is actuated to acquire a first image with a target of interest disposed at a predetermined relative position within a field of view thereof. The second imaging device is actuated to acquire a second image with the target of interest disposed within a field of view thereof. A target feature finder is executed in a processor to detect the target of interest within the second image. A plurality of user prompts are generated at the second imaging device responsive to detection of the target of interest in the second image. The user prompts include: visual indicia adaptively applied to the second image to visually distinguish the target of interest, and orientation correction alerts adaptively generated to guide angular displacement of the second imaging device to situate the target of interest at the predetermined relative position within its field of view.

16 Claims, 11 Drawing Sheets

(56) References Cited

U.S. PATENT DOCUMENTS

| | | | |
|---|---|---|---|
| 2006/0010697 A1* | 1/2006 | Sieracki | G02B 23/00 |
| | | | 33/267 |
| 2012/0027290 A1* | 2/2012 | Baheti | G06K 9/6857 |
| | | | 382/154 |
| 2012/0314899 A1 | 12/2012 | Cohen et al. | |
| 2013/0234934 A1 | 9/2013 | Champion et al. | |
| 2013/0332064 A1 | 12/2013 | Funk et al. | |
| 2014/0009604 A1 | 1/2014 | Hinderling et al. | |
| 2014/0168358 A1* | 6/2014 | Gong | H04N 5/23206 |
| | | | 348/39 |

\* cited by examiner

METHOD AND SYSTEM FOR PARALLACTICALLY SYNCED ACQUISITION OF IMAGES ABOUT COMMON TARGET

RELATED APPLICATION DATA

This Application is based on U.S. patent application Ser. No. 14/218,573, filed 18 Mar. 2014, which is based on Provisional Patent Application No. 61/802,110, filed 15 Mar. 2013.

BACKGROUND OF THE INVENTION

The present invention is directed to a method and system which employ personal communications devices known in the art such as smartphones, personal digital assistant (PDA) type devices, tablet computers, and the like suitably equipped with built-in camera or other imaging capabilities. Personal communications devices are employed at multiple viewing positions for various collaborative applications to reliably acquire and/or track one or more common targets. The visual information obtained through images acquired by each device may be integrated with the device's inertial measurement information to augment the accuracy of positioning and/or tracking capabilities using the device.

The subject method and system improve upon various multiple sighting device systems and methods heretofore known, such as those disclosed in U.S. Pat. No. 7,225,548. In certain applications, the subject method and system enable multiple physically separated users to bring their image capture devices to bear on the same target. For example, the method and system enable various mobile personal communication devices to perform relative alignment functions using their internal cameras.

In accordance with certain aspects of the present invention, the subject system incorporates the smartphone, tablet, PDA, or other suitably equipped personal communications device of different users located within a proximate distance of one another. It may be desirable for one user to point out a vehicle, a bird in a tree, a person in a crowd, a sign, or a landscape feature of interest using the device without resorting to descriptive discussion. Each user may dynamically point features out to the other by suitable selection on the image displayed on his/her device. Similarly, a collection of users may all follow the lead of a first user. Such operations would be beneficial for use in various applications like military and law-enforcement, security, nature watching, scientific observation. They may also be beneficial, for example, in the context of augmenting social media to enable individuals to point out interesting things to their friends over a distance.

In other exemplary applications, the subject system may be used for time delayed finding of market targets in the 3D world. For example, a user, having established a virtual reference point in the physical word may record that information so that upon a revisit to the same general area they may spot the point and find it again easily. Accordingly, the system may be used to mark points of interest for oneself or for others. A camera view of the world on one's smartphone or tablet may in real-time combine available geo-location and orientation sensor data with the pixel level processing according to the process of information fusion described herein, to float visual markers or labels in the camera view as if they were attached to the physical world being observed. Thus, any user may view both the real world and a virtual overlay in a spatially convergent user interface. Such overlays have further potential in wearable computing solutions, such as electronic glasses, which obviate the need for the user hold up and point their computing device before them while walking.

Geo-tagged image or video transfer is an automatic function of many PDA type or other such personal communications devices, yet their corresponding tolerances tend to be wholly inadequate for meeting the needs of tactical teams or others requiring finer precision. For instance, GPS chipsets (when operational) provide accuracy at best on a scale of tens of meters, while compass modules (when present and sufficiently distant from interference) provide perhaps 5-10 degrees of orientation accuracy. In GPS-denied and metal-heavy military environments, accuracies suffer even more significantly.

Thus, built-in functions of currently existing mobile devices for personal communications are not sufficient to bring multiple cameras to bear on the same target with the accuracy and reliability in many applications, especially if a "slew-to-cue" capability or accurate tactical position details on an observed subject of interest are to be provided.

There is therefore a need for a method and system whereby personal communications devices at multiple imaging positions are coordinated to accurately and reliably bring their imaging fields of view upon a common target. There is a need, moreover, for such method and system to provide precise relative alignments between users' local points of view and provide reliable image-based device orientation information relative to the target for corrective integration with device IMU and related sensor package measurements. "IMU" is used contextually herein to describe any combination of sensors or sensor packages that may track orientation and changes in orientation, and, in certain embodiments, position and changes in position, including but not limited to accelerometers, angular accelerometers, gyroscopic measurements, compass heading, inclinometers, GPS, differential GPS, RF ranging, and so forth.

SUMMARY OF THE INVENTION

It is an object of the present invention to provide a method and system for accurately and reliably coordinating personal communications devices at multiple imaging positions to align their fields of view with a common target.

It is another object of the present invention to provide a method and system for automatically guiding image-based collaborative orientation of personal communications devices at multiple imaging positions with respect to one or more common targets.

It is yet another object of the present invention to provide a method and system that calibrates a personal communication device's available IMU measurements by corrective integration with image information acquired by the device.

These and other objects are attained by a method provided in accordance with certain embodiments of the present invention for parallactically synced acquisition of images about a common target from mutually displaced imaging positions. The method comprises establishing at least first and second imaging devices respectively at a first and a second of the imaging positions. The first imaging device is actuated to acquire a first image with a target of interest disposed at a predetermined relative position within a field of view thereof. The second imaging device is actuated to acquire a second image with the target of interest disposed within a field of view thereof. A target feature finder is executed in a processor to detect the target of interest within the second image. A plurality of user prompts are generated at the second imaging device responsive to detection of the target of interest in the second image. The user prompts include: visual indicia adaptively applied to the second image to visually distinguish the target of interest, and orientation correction alerts adaptively generated to guide angular displacement of the second imaging device to situate the target of interest at the predetermined relative position within its field of view.

A method established in accordance with certain other embodiments of the present invention provides for automatically guiding visual alignment to maintain coincident fields of view about a common target for images captured from mutually displaced imaging positions. The method comprises establishing at least first and second image capture devices respectively at first and second imaging positions, and actuating the first image capture device to capture a first image with a target of interest substantially centered within a field of view thereof. Target of interest and angular orientation measurement data of the first image capture device are transmitted to the second image capture device for guiding its angular orientation toward the target of interest based thereon. The second image capture device is actuated to capture a second image with the target of interest disposed within a field of view thereof. An angular orientation measurement for each of the first and second image capture devices is actuated when the first and second images are respectively captured thereby. A target feature finder is executed in a processer to detect the target of interest within the second image. A plurality of user prompts are adaptively generated at the second image capture device responsive to detection of the target of interest in the second image. Such user prompts include: predefined visual indicia to identify the target of interest, and orientation correction alerts to guide angular orientation of the second image capture device to situate the target of interest substantially centered within the field of view thereof. The orientation correction alerts include visually displayed directional markers applied to the second image.

A system formed in accordance with certain other embodiments of the present invention provides for parallactically synced acquisition of images about a common target from mutually displaced imaging positions. The system comprises at least first and second imaging devices disposed in displaceable manner at respective first and second imaging positions. The first imaging device acquires a first image with a target of interest disposed at a predetermined relative position within a field of view thereof, and the second imaging device acquires a second image with the target of interest disposed within a field of view thereof. A target feature finder module detects the target of interest within at least the second image. An integration module coupled to the target feature finder module generates a plurality of user prompts at the second imaging device responsive to detection of the target of interest in the second image. The user prompts include: visual indicia adaptively applied to the second image to visually distinguish the target of interest, and orientation correction alerts adaptively generated to guide angular displacement of the second imaging device to situate the target of interest at the predetermined relative position within the field of view thereof.

DETAILED DESCRIPTION OF THE PREFERRED EMBODIMENTS

Figure 1:
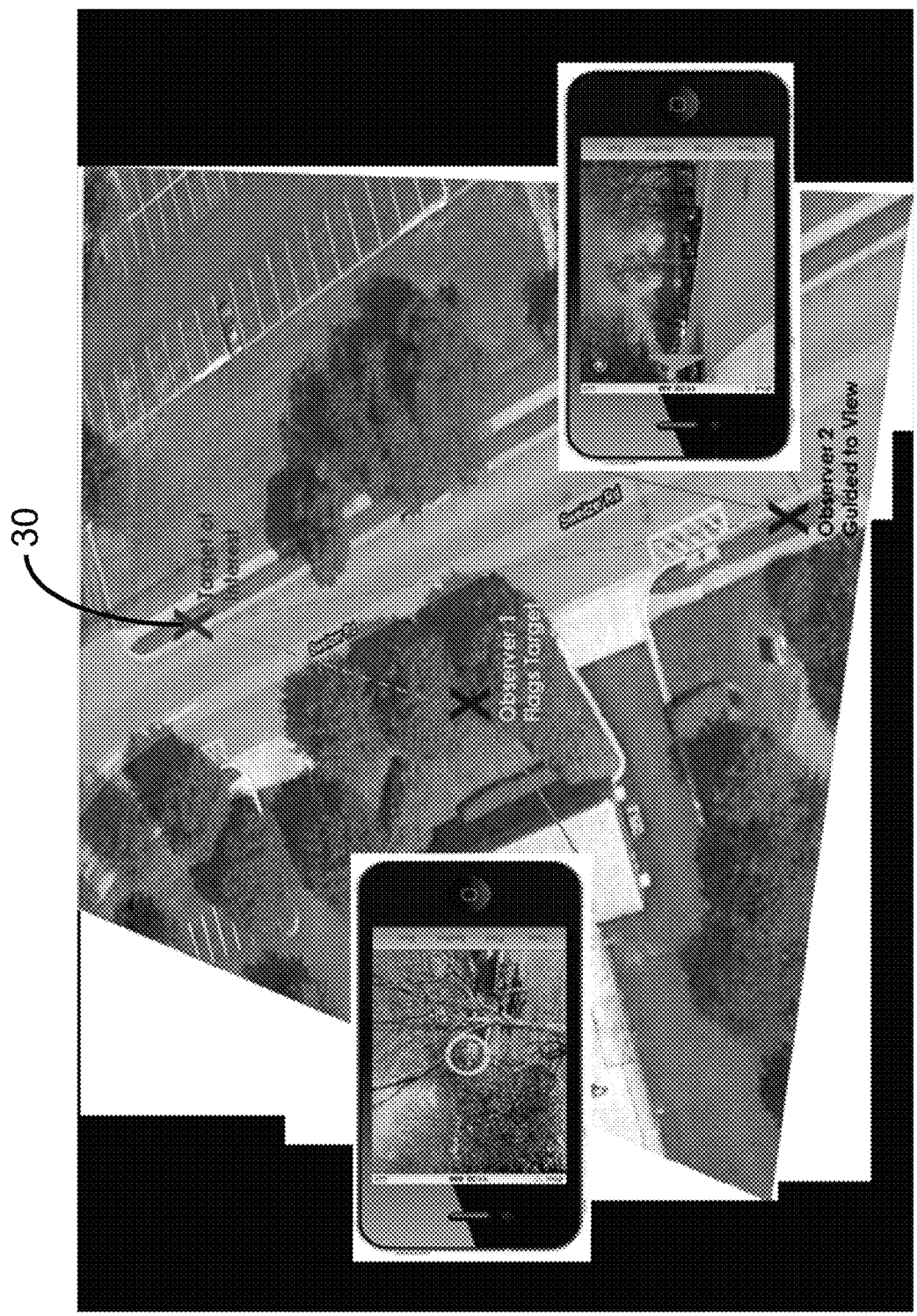
FIG. 1 is an illustrative image schematically illustrating the relative positioning of mutually displaced imaging devices with respect to a target of interest during use of an exemplary embodiment of the present invention.

Generally, the subject method and system automatically guide the parallactically synced acquisition of images, and preferably tracking, about a common target by imaging devices located at mutually displaced imaging positions. In an exemplary embodiment of the present invention, the subject method and system employ personal communications devices with built-in camera capabilities and user displays of their acquired images. For example, a system implementation employs handheld camera enabled smartphones for various collaborative applications to reliably acquire and/or track one or more common targets. In certain applications, the system utilizes an energy reference frame to determine a baseline distance between two smart phone devices. A time of flight for blue-tooth or ultrasonic signals are preferably used in those applications. It further enables feature matching between imaging systems using computer-vision derived image feature-matching technology, examples of which include suitable feature matching transforms known in the art such as Scale Invariant Feature Transforms (SIFT), Speeded Up Robust Features (SURF), or any other simplified fast correlation of image components to find matched feature sets in images of each camera. A baseline distance between different users' devices is then used to compute a relative angle so that one user may direct the other. Once targets have been acquired by each of the respective users' devices, built in or supplemental internal inertial measurement unit (IMU) capabilities for each device are preferably applied to track an identified target (that is, update the device's orientation to maintain view of the identified target). Because a device's IMU will typically drift, repeated recalibration via matched imaging contributes significant advantages over conventional systems which rely solely upon IMUs or, alternatively, GPS geo-locations (since standalone GPS positioning is too imprecise to solve the problem of calculating local relative angles for many applications).

The subject method and system may be applied in various fields for a wide array of different applications. For instance, the subject method and system may be used to enable one user to guide another user to focus on a particular person or target of interest. Additionally, the subject method and system may be utilized to provide more precise geo-location information about a particular target of interest. Such capabilities are advantageous in a wide array of different operations including tactical dismounted operations, forward observer or gunnery operations, and security and policing actions, to name a few.

Another advantage of the subject method and system which bring multiple cameras from multiple positions to focus on the same target is the ability to extract three dimensional (3D) point cloud information in certain applications. This allows for not only improved triangulation of locations for purposes such as targeting, but may be adapted to enable back-end servers to construct a 3D mesh model in a more cost efficient manner compared to currently available systems like Flash-LIDAR without sacrificing detail quality. In various tactical applications, the subject method and system integrate handheld and mounted cameras to provide real-time, evolving, 3D tactical maps to command personnel and to individual soldiers via their PDA type interfaces.

FIG. 1 illustrates use of a system formed in accordance with an exemplary embodiment of the present inventions. In the scenario illustrated, two physically separated observers, each equipped with a personal communications device, are looking for a target of interest 30, a particular vehicle in this illustration. This scenario is provided for illustrative purposes only and is but one of a host of different situations which would benefit from use of the subject system. In FIG. 1, the two physically separated observers search for the target vehicle 30. Once Observer 1 has spotted the target 30, the target is flagged as a reference by the system which captures both relative orientation information and image feature details therefor. Observer 2 preferably receives on his or her personal communications device guidance information based upon the flagged reference. If target 30 is within the visual field of Observer 2, the target is marked as such in his/her device's image by visual indicia, such as a target frame 32 (shown in FIG. 3). If the device must be moved to bring the target into view (or to center it within the view), a guidance arrow 34 indicates direction of the required device slew (shown in FIG. 3) toward that end.

The distance between observers and the target 30 in this example are such that the relative sight angle for each observer is significantly different. GPS estimates of the observers' locations are not on their own accurate enough to provide a baseline correction for the resulting parallax effect. Compass/IMU errors further conspire to make tracking to the common target crude at best. The subject system utilizes a combination of processes to gracefully correct these inaccuracies and to provide precise relative angle information to guide each device's user. The system allows multiple camera-equipped systems (handheld or mounted) to rapidly identify and slew to the same target. Once flagged, targets and threats may also be tracked by the system and thereafter easily relocated by users (who may be fellow squad members engaged in tactical operations, for example).

Figure 2:
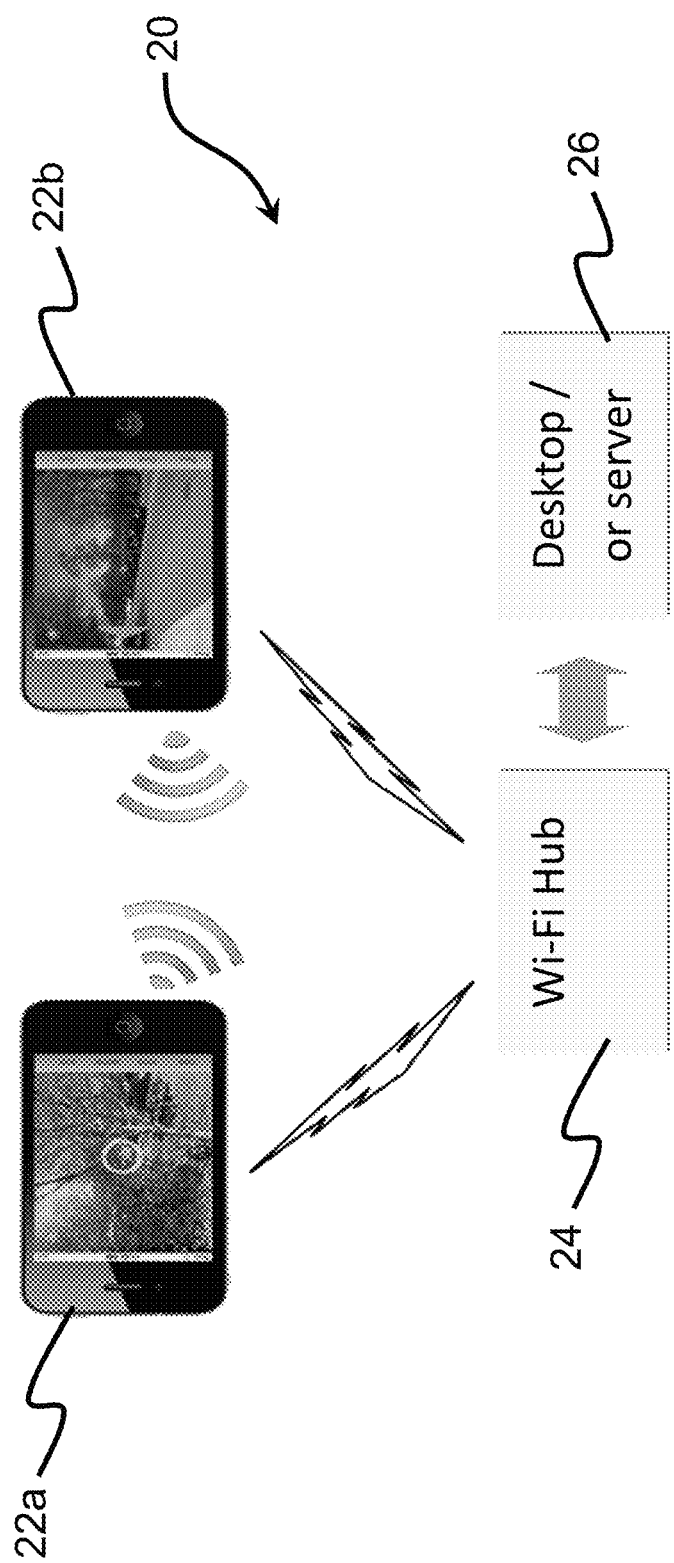
FIG. 2 is a schematic diagram illustrating the interaction of certain devices and components in a system formed in accordance with an exemplary embodiment of the present invention.

FIG. 2 illustrates the general configuration of an orientation tracking system 20 formed in accordance with an exemplary embodiment of the present invention. System 20 includes amongst its features two or more personal communications devices 22a, 22b (such as the commercially available iOS line of devices). FIG. 2 illustrates the iOS devices 22a, 22b being linked via a host 24 (comprising a Wi-Fi hub in the example shown) to a storage device 26 that may include a back end server, desktop, laptop computer, or the like. But the devices 22a, 22b may be linked in any other suitable manner known in the art for intercommunication and storage of information. Real-time processing occurs locally on the iOS devices 22a, 22b; however, the host 24 (implemented as a Wi-Fi hub in FIG. 2) preferably provides back-end services to both host the devices' collaboration and to at least partially offload image and signal processing that might otherwise prove too slow if entirely executed locally on the devices 22a, 22b themselves. The collaboration between devices may also be accommodated over a Bluetooth peer-to-peer network employed the host 24. However, Wi-Fi provides more practical communications range for many applications.

Figure 3:
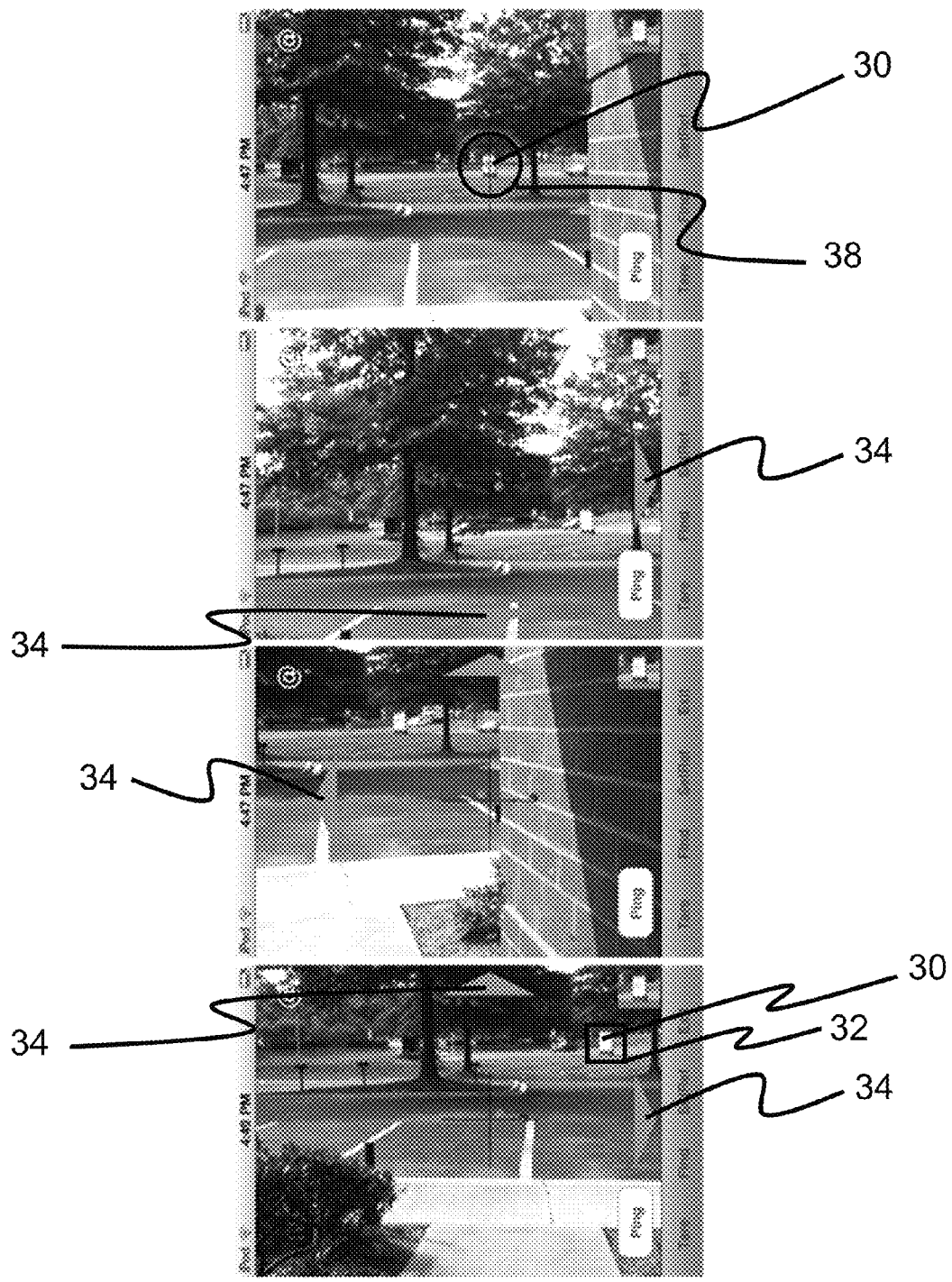
FIG. 3 is a set of images as acquired and displayed respectively at a plurality of mutually displaced imaging devices during use of a system formed in accordance with an exemplary embodiment of the present invention.

FIG. 3 illustrates screen shots from an embodiment of system 20 employing a group of commercially available iPod devices to acquire images configured for target tracking. In the top frame, a target 30 appearing in an image acquired by a first device is identified and established as a reference. The reference is transmitted to another iPod or other iOS device 22 within the given group of devices. Each iPod 22 tracks device orientation to the established target of interest 30, indicating with guidance arrows 34 which direction to slew the device 22 to re-center its field of view on the same target of interest 30.

The bottom frame of FIG. 3 shows an image-based "feature find" operation on a second iPod, referenced to the first. In addition to the guidance arrows 34, a target frame 32 has been placed around the target sign 30. Tests suggest that targets may be located based on visual clues with greater than 20 degrees of angular separation between observers.

The system 20 may be equipped with additional features such as attitude indicators, inter-PDA messaging, and the ability to find range between devices to suit the particular requirements of the intended application. The user interface of system 20 incorporates, for example, numerous touch-screen enabled properties like swipes to hide or access features, and automatic rotational adjustment of display orientation.

Figure 4:
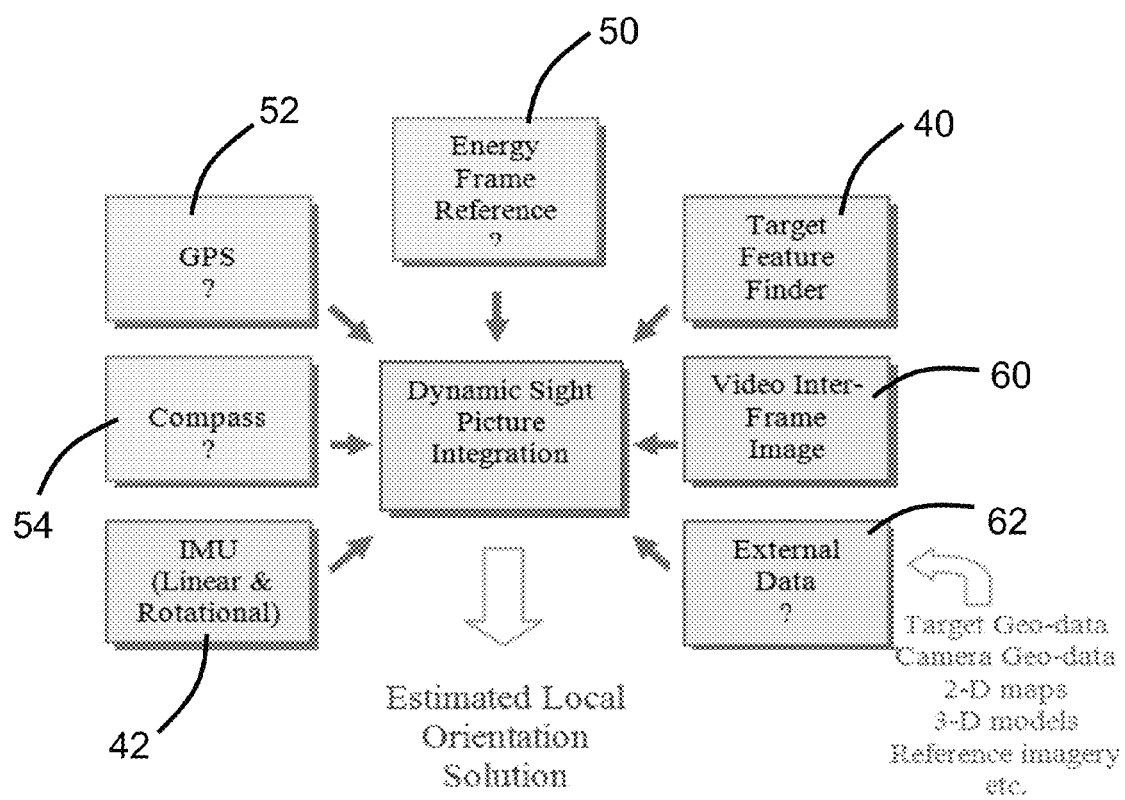
FIG. 4 is a schematic diagram illustrating the interaction of certain modules in a system formed in accordance with an exemplary embodiment of the present invention.

FIG. 4 illustrates the integration of information to provide updated tracking information for a target 30 relative to a local user's personal communications device view. Unit items shown in blocks 40 and 42 provide the primary informational references in this configuration of the system: namely, a high-drift, low accuracy IMU 42, and an image processing based target feature finder 40. When available, these units are supplemented by the features shown in blocks 50, 52 and 54: namely, GPS 52 and Compass 54 devices which provide coarse grained estimations of absolute geo-reference frame information. Energy frame references 50 provide information from point-to-point energy transmissions between the users' personal communications devices, such as angle of incidence or time-of-flight information, from which relative position data may be derived. An example is the exchange of ultrasonic cue signal transmissions between personal communications devices. Items in blocks 60 and 62 represent features which may be incorporated into the subject system 20 depending upon the particularly intended application. For instance, frame-to-frame video comparisons 60 enable a user to track field motion and to integrate frames between devices to estimate 3D details, and available external data 62 may enable integration with other systems.

In connections with target tracking which integrates data provided for instance by a device's IMU and its target feature finder, the integration problem is addressed by assigning time-varying confidence values to each data element. This creates an estimation problem that is related to Kalman tracking. The target feature finder has high, instantaneous confidence and provides the dominant correction to the other data.

The illustrated system 20 preferably employ a comparison algorithm optimized for camera view angle, color and light balance, and other aspects of the given iOS devices' cameras. Feature matching may be accomplished by any suitable processes known in the art including but not limited to SIFT or similar SURF. However, it is noted that SIFT and SURF feature vector computations are typically not fast enough for real-time thin client applications. Furthermore, typical visual features matching algorithms present significant limitations in the context of large displacements of the point-of-view.

Figure 5A:
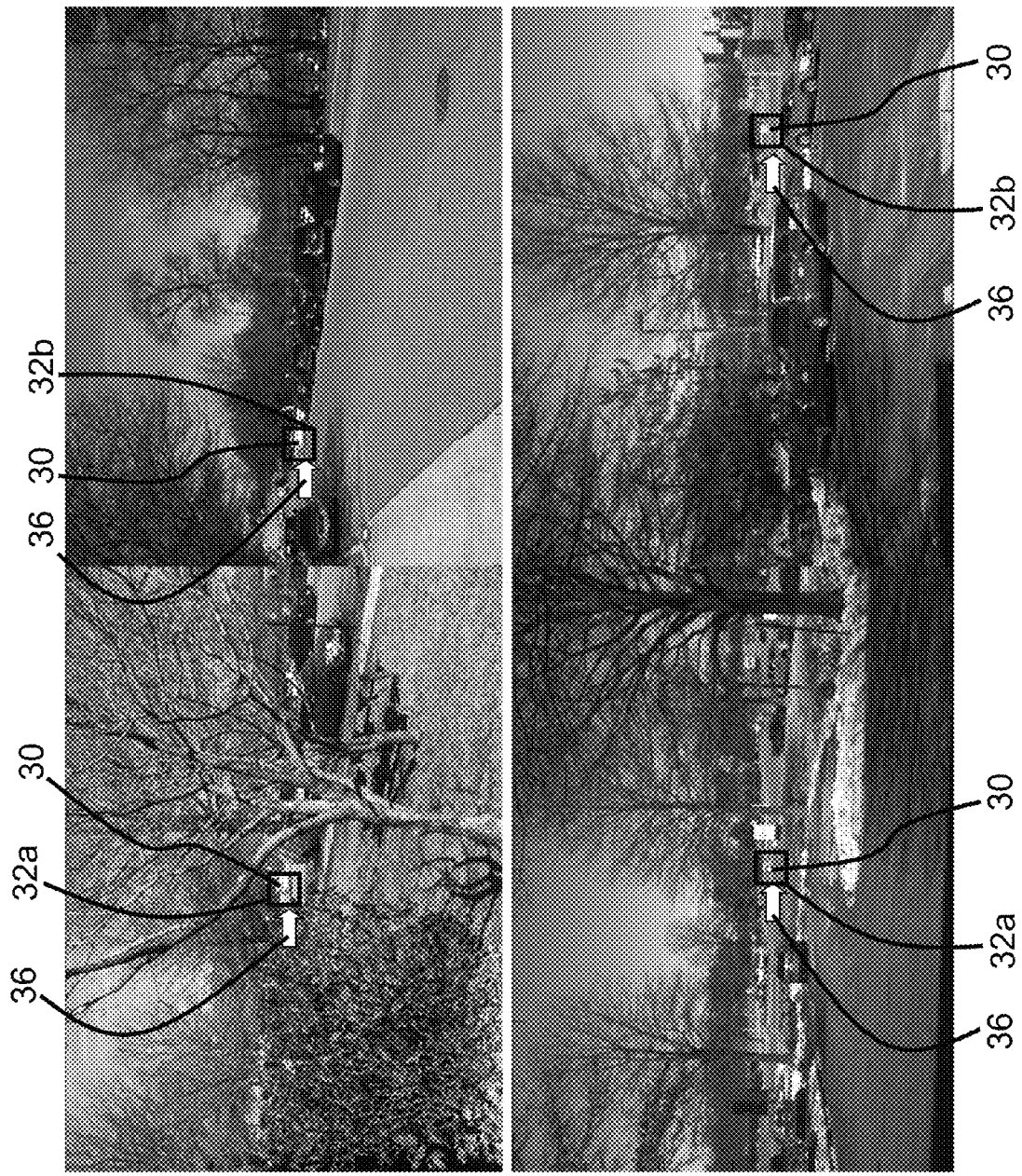
FIG. 5A is a comparative set of images as acquired and displayed respectively at a plurality of mutually displaced imaging devices during use of a system formed in accordance with an exemplary embodiment of the present invention.
Figure 5B:
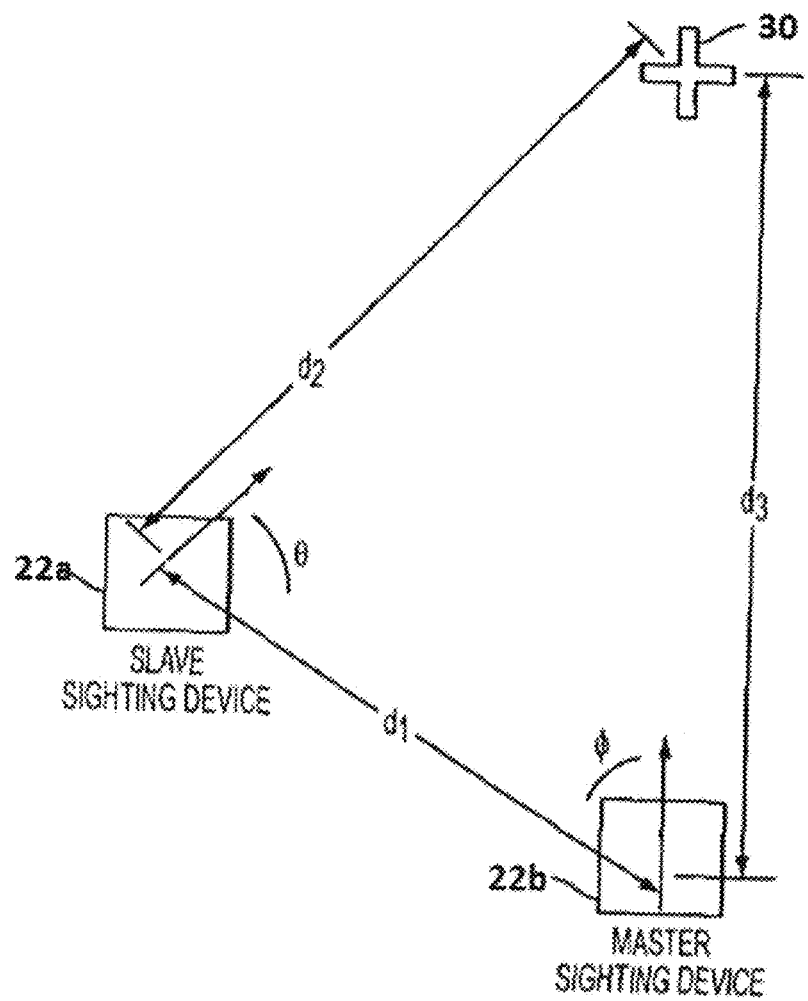
FIG. 5B is a schematic diagram geometrically illustrating the relative positioning of mutually displaced imaging devices with respect to a target of interest.

Accordingly, system 20 utilizes a transform that produces computationally fast results and has high accuracy in solving the multiple angle-of-view problem. FIG. 5A shows comparative images acquired by personal communications devices at mutually displaced imaging positions. They illustrate matching and recovery of a target object 30 from significantly different viewpoints. FIG. 5B schematically illustrates the parallax effect of such mutually offset devices 22a, 22b with respect to a common target 30.

In FIG. 5A, each pair of frames shows a target 30 flagged on the left by target frame 32a and the corresponding target automatically located in an image from another viewpoint flagged by target frame 32b. As FIG. 5A illustrates, the feature-matching processing executed by the system operates correctly notwithstanding significant differences in viewing angle between imaging devices and significant rearrangement of extraneous foreground and background features as a result. Directional arrows 36 are shown only for notational purposes, and not part of the visually displayed indicia actually applied to an acquired image in the illustrated system embodiment.

The feature comparison process employed in the target feature finder module of system 20 is based conceptually on SIFT processes known in the art. Comparisons may also be drawn to various alternative image processing techniques, including but not limited to SURF, and various auto- or cross-correlation image matching techniques.

Generally, in known conventional SIFT processes, transform features are extracted in four steps. The first step is to detect extrema in a derived scale space of the image. To do so, in a basic algorithm, the original image is progressively blurred by convolution with a two dimensional (2-D) Gaussian function of increasing sigma, then a Difference of Gaussians (DoG) is created for each sequential pair of such convolutions by subtracting from each blurred image the corresponding blurred image with the next largest sigma. This process is generally implemented by blurring the image and down-sampling by powers of two ("octaves"), each of which is operated on over a predetermined number of sub-octave steps. This produces a set of two dimensional x-y referenced matrices, $DoG_k$, indexed by scale (k). Within this DoG space one determines local minima or maxima points (i.e., extrema) relative to all neighbors in x and y pixel location dimensions and the k scale dimension. In typical implementation, the location of the feature is further refined down to sub-pixel accuracy using a truncated Taylor expansion (up to, for example, the quadratic terms). Extrema feature points are eliminated if they have low contrast (and thus exhibit poor sensitivity), or if they fall on an edge (and are thus poorly localized). The third step of conventional SIFT is to assign an orientation to each feature based upon local image gradients at a given location. The direction of the largest gradient is generally the primary orientation associated with the feature point, though features points may be duplicated if there are additional gradient directions at least 80% as strong as the largest gradient. This is a course-grained overview; however, mathematical details, other considerations and related process variants are well understood in the art. Once this information has been computed, the final step is to calculate the feature descriptor vector.

Feature descriptor vectors are calculated using local gradients in an area around a feature point and are typically computed in an oriented, multi-dimensional histogram grid around the feature point, taken with reference to its preferred scale and primary orientation. This provides a signature vector that is useful for matching features from one image to features from another. To perform object recognition, the SIFT operation is performed on both the reference image and a test image, and only those features which match with respect to their signature vectors are used. Clusters are formed by sets of features, the co-occurrence of which, with the same relative orientation, scale, and pose (or disposition relative to each other across space), provides high confidence that an object in any image or set of images is the same object each time said clusters are found. Clusters of features are preferably employed over individual feature points in matching to eliminate spurious matches. An object is considered to be successfully identified if there are a certain number of features—for example, at least 3 features—are found in the final cluster.

While full conventional SIFT, or SURF (a related multi-scale wavelet based analysis) may be employed to match images, it is cumbersome to do so in real-time due to hardware speed limitations in practical systems of interest. Thus, in accordance with certain aspects of the invention, system 20 in the illustrated embodiment executes a reduced matching process which, when taken together with appropriately set thresholds for successful matching, increases the speed of image feature matching. Moreover, the speed of image feature matching, whether full or reduced, may be increased by wholesale relocation of SIFT/SURF or related processes from the mobile imaging devices themselves to a supporting server or other processor resource, or by carrying out the most processing-intensive portions offboard and supplementing the same with less burdensome portions carried out locally onboard the devices, depending on the particular requirements of the intended application.

In accordance with an exemplary embodiment of the present invention, the reduced matching process carried out by system 20 for target feature finding includes computing the Difference of Gaussians (DoG) for a limited number of scales for the reference and test images. These reference and test images will correspond, for example, to the lead user's target image and secondary user's full FOV image. Rather than reducing to extrema-point feature keys, the illustrated embodiment relies on certain characteristics specific to the cooperative sight-picture target finding application to simplify processing. In particular, physical targets will typically remain upright as will the lead and secondary users. Moreover, though to a lesser extent, the physical target will typically have a similar size in the visual field unless the users are at greatly different range to the target. Thus, the approximate target upright relative orientation and scale constancy between the lead and secondary users' acquired images will yield constancy in the local shape of their respective DoGs around the target, which in turn, allows a fast cross-correlation to be exploited between the reference image's DoG and the test image's DoG. For speed, this correlation may be further limited to a predetermined set of scale and octaves. An embodiment optimized to favor fast processing over cross-scale matching accuracy may, for example, employ only 2 Gaussians evenly spaced in only the first octave. With DoGs thus produced for both the reference and test images, the maximum cross correlation shift of the two is subsequently determined and used to find the location within the test image most likely to contain the reference object of interest. It is therefore the collapsed DoG space that is operated on in the manner of finding peak correlation.

On account of contrast and lighting variations across the field that may otherwise artificially dominate the peak finding, the summation value must be normalized to make a robust decision. Such normalization may be accomplished in two stages: first, subtracting the average pixel value of the reference image DoG from both DoGs and calculating the normalization coefficients for each pixel and second, then dividing the summation by these coefficients at each pixel to obtain a normalized summation arranged so that a perfect match will have a value of one. These normalization coefficients are determined by calculating a correlation between: a matrix of the squares of each pixel of the de-meaned test DoG, and a matrix of the same size as the reference image DoG but containing only unit values. Thereafter, the pointwise square root at every pixel location is taken and multiplied by the square root of the sum of the squares of the pixels in the reference image DoG.

Peaks above a predetermined threshold in this normalized space are found in order to produce a list of candidate locations for the reference image features within the test image. The final determination of a best match is made in accordance with predetermined rules. In certain alternate embodiments, further analysis may be done on each of these candidate locations to identify a preferred match. Generally, the largest peak is simply chosen and compared to a preset threshold to determine whether or not to accept the result provided. Thus, in a system formed in accordance with an exemplary embodiment of the subject system, a lead-user's target image is matched to a location in the secondary user's FOV image or is rejected as not findable in that FOV if no match exceeds the predetermined value.

Again, where, in a particular application, a smartphone with limited processing speed such as the iPhone is used as the personal communications device and no accelerator or linked server processing is available, some of the aspects of the target feature finding process are simplified. To summarize: first, the Difference of Gaussians (DoG) as with SIFT is computed and then the cross-correlation between the reference image's DoG and the test image's DoG is determined. This correlation is added together for every scale and every octave. To preserve for processing speed, it may be desirable to use 2 Gaussians evenly spaced in only the first octave. Next, the maximum value of the summation is determined and normalized and used to define the location most likely to contain the object of interest.

To normalize the summation, the average pixel value of the reference DoG is subtracted from both DoGs and normalization coefficient for each pixel is computed. The summation is then divided by the coefficients at each pixel to obtain a normalized summation where a perfect match will have a value of one. The normalization coefficients are computed by generating a correlation between a matrix of the squares of each pixel of the determined test DoG and a matrix of the same size as the reference DoG containing only ones. Then, the square root of every pixel is multiplied with the square root of the sum of the squares of the pixels in the reference DoG. A threshold is thereby set to define whether or not to accept the result provided.

Processing in this manner is advantageous in that it allows a user to set a threshold of confidence in the findings. Hence, when the process fails to find the correct match—either because the target is not within the field of view or the processing is confused by other visual features—the location estimate may be ignored.

Figure 6:
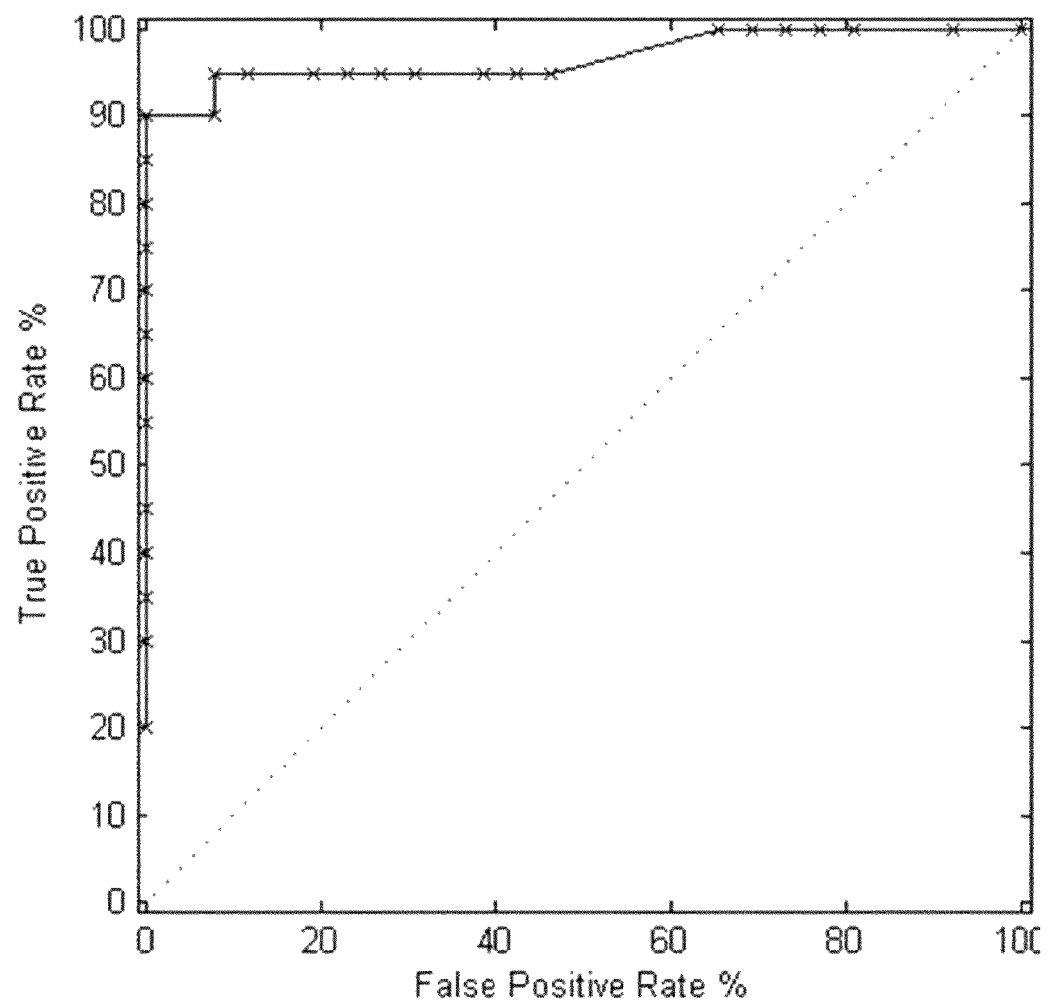
FIG. 6 is an illustrative graphic plot showing a sampling of points to indicate reliably high success rate for a target feature finding process executed by a system formed in accordance with an exemplary embodiment of the present invention.

To illustrate utility of the simplified processing, FIG. 6 shows a sample ROC ("receiver operator characteristic") curve generated by varying such threshold over a representative set of target find operations carried out by system 20 in an illustrative application. As is well understood in the art, this curve displays measurements of the trade-off between true-positive accurate detections and false-positive incorrect detections as one adjusts variables such as a detection threshold. The ROC curve indicates that a user's device is reliably able to flag and reject bad matches of the target reference image within test images. Moreover, since each video frame captured by a device may be searched to locate the reference target, the density of reliable target hits available for tracking is significant even if matches to the target in many frames are rejected as unreliable.

In addition to the IMU and feature-based corrections, the subject tracking system preferably uses ultrasonic ranging between devices and derives a parallax baseline estimate therefrom. This estimate is obtained by emitting a timed chirp at each personal communications device 22a, 22b in response to a query from either user. Each device receives the other's chirp, and a time of flight is calculated. This renormalizes the range between devices. While described in connection with two users, the estimate may also be achieved when greater numbers of users are involved in tracking. In such instances, each user's device preferably receives the chirp from the remaining users.

In accordance with certain aspects of the present invention, the subject system incorporates the smartphone, tablet, PDA, or other suitably equipped personal communications device of different users located within a proximate distance of one another. It may be desirable for one user to point out a vehicle, a bird in a tree, a person in a crowd, a sign, or a landscape feature of interest using the device without resorting to descriptive discussion. Each user may dynamically point features out to the other by suitable selection on the image displayed on his/her device. Similarly, a collection of users may all follow the lead of a first user. Such operations would be beneficial for use in various applications like military and law-enforcement, security, nature watching, scientific observation. They may also be beneficial, for example, in the context of augmenting social media to enable individuals to point out interesting things to their friends over a distance.

In other exemplary applications, the subject system may used for time delayed finding of market targets in the 3D world. For example, a user, having established a virtual reference point in the physical word may record that information so that upon a revisit to the same general area they may spot the point and find it again easily. Accordingly, the system may be used to mark points of interest for oneself or for others. A camera view of the world on one's smartphone or tablet may in real-time combine available geo-location and orientation sensor data with the pixel level processing according to the process of information fusion described herein, to float visual markers or labels in the camera view as if they were attached to the physical world being observed. Thus, any user may view both the real world and a virtual overlay in a spatially convergent user interface. Such overlays have further potential in wearable computing solutions, such as electronic glasses, which obviate the need for the user hold up and point their computing device before them while walking.

Figure 7:
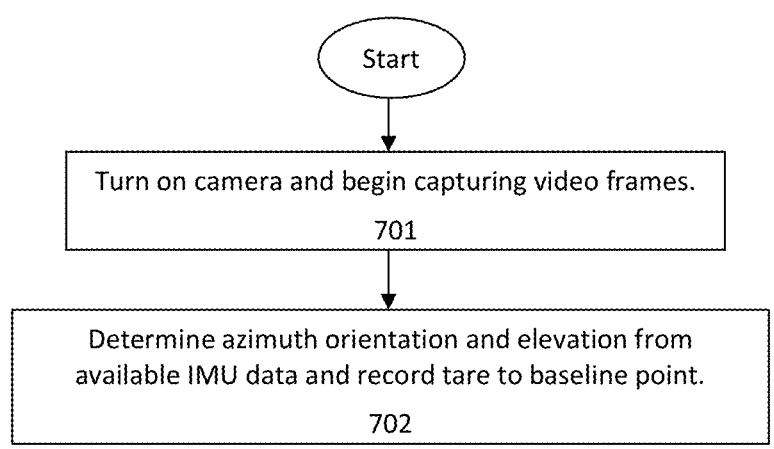
FIG. 7 is a flow chart illustrating a flow of processes for set-up of an imaging device employed in of a system formed in accordance with an exemplary embodiment of the present invention.

In accordance with an exemplary embodiment of the present invention, set-up of the subject system is accomplished by carrying out the steps illustrated in FIG. 7. Preferably, users activate respective device apps suitably implemented in their personal communications devices. Then, each device begins collecting video frames and displaying them. Finally, each device's absolute compass heading and angle of elevation is estimated from its IMU data, and a baseline point is recorded.

More specifically, as shown in block 701, each device provides the user a view and also initiates its camera to begin collecting video frames updated on a quasi-real time basis. In certain exemplary embodiments, the user is afforded a view directly through the camera, as is typical of smartphones, tablets, PDAs and other personal communications devices, by providing a real-time display of the camera view on the screen. In alternate embodiments, the camera may operate in parallel to an optical or other secondary view system. Such an alternative would be appropriate, for instance, where the device is used in conjunction with magnifying optics, for example, a scope or binoculars, or in a wearable computing configuration where the user's view is directly through augmented glasses or similarly linked viewing equipment.

In block 702, each device sets up and determines its baseline orientation according to available IMU data. In many devices this includes magnetic compass azimuth and angle of elevation determined by accelerometers. In such embodiments, a convenient, absolute orientation is available. However, this is an optional feature which may be incorporated in certain embodiments of the system. In other embodiments, a baseline orientation point is recorded by the system against which future orientation changes are measured.

An IMU is used herein to describe any combination of sensor packages that may track orientation and changes in orientation, and, in certain embodiments, position and changes in position. As is well understood in the art, accelerometers and rotational accelerometers of a variety of technologies may be used to achieve this goal. These may be combined with, for example, a flux gate or other electronic compass, GPS, etc. (see FIG. 4) to achieve better absolute referencing. Again, it is noted that in accordance with certain aspects of the present invention, issues of accuracy, variance, and drift in these various sensor packages are overcome to achieve a level of co-alignment on a target that would not otherwise be possible, particularly in small, commodity priced devices.

Figure 8:
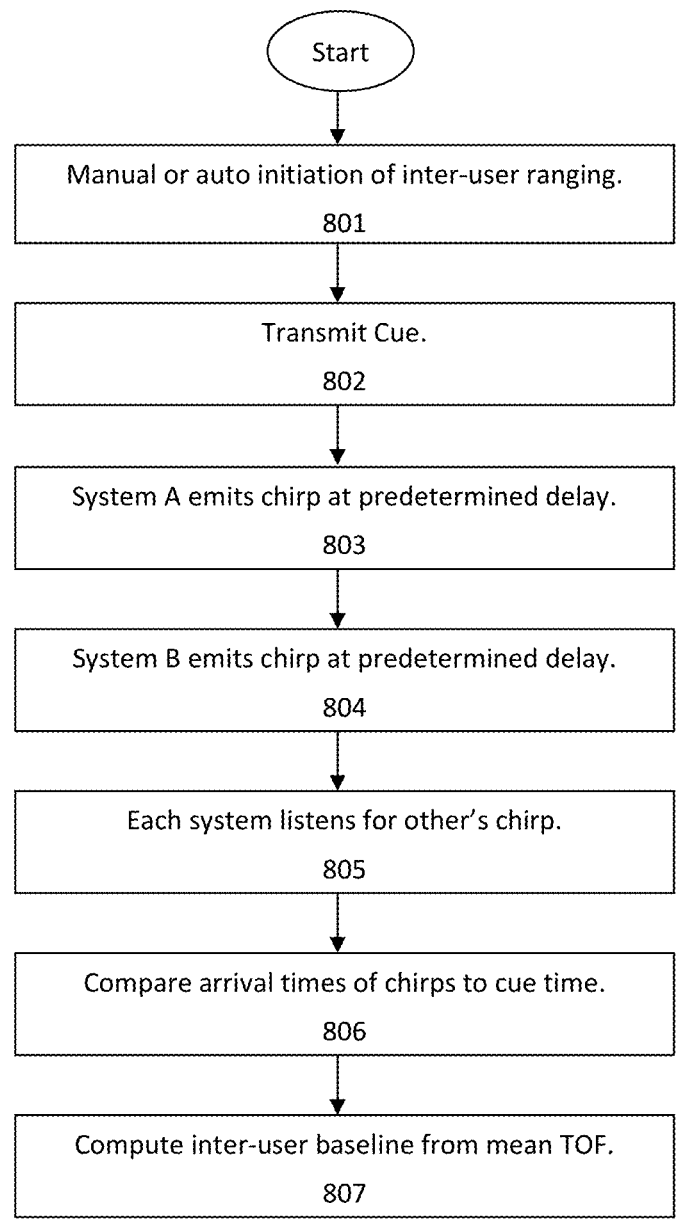
FIG. 8 is a flow chart illustrating a flow of processes for an inter-user ranging process carried out by a system formed in accordance with an exemplary embodiment of the present invention.

In accordance with an exemplary embodiment of the present invention, the subject system carries out inter-user ranging according to the process as illustrated in FIG. 8. Generally, range calibration is selectively initiated by a user pushing a button or, alternatively, the system may be programmed to initiate at predetermined intervals. Next, each device emits a chirp, one delayed from the other. The devices listen for one another's chirps. Thereafter, the times of the chirps are compared to a notice event signal sent by the RF network, and the times of flight are computed and averaged for the chirps to obtain inter-user baseline distances.

As previously discussed herein, it is desirable to measure a base line distance or positional offset between the two or more user devices involved in the cooperative imaging process. Absolute references such as GPS provide bearing information, but, on their own, yield insufficient accuracy for the purpose of making necessary parallax angle corrections. Thus, it is preferable to supplement such coarse measurements or users' estimates with an energy frame reference-based inter-user ranging. This may be achieved by numerous means; however, in an exemplary embodiment, a sonic chirp transmitted between each pair of devices is used to improve baseline distance estimates.

Referring to FIG. 8, in certain embodiments, a device orientation tracking process is automatically initiated while in other embodiments, the orientation process is manually initiated, as shown in block 801. Manual calibration is preferable when stealth operation is desired, as users will typically have a good idea when they have moved away from their last operation points. However, automatic initiation is easily implemented either at fixed intervals, or upon predetermined conditions which may include, for example, motion of one of the other units of greater than a predetermined amount, or a failure to find shared targets within a predetermined accuracy.

Upon initiation of the process, a cue is transmitted, as shown in block 802, from the initiating device. This cue instructs the other devices that a baseline calibration is taking place, and in accordance with certain embodiments also provides a time reference for time of flight (TOF) calculations to be performed at the end of the process. Thus the cue is preferably transmitted over an RF network link or other fast channel between the devices, so that its time of propagation is not a significant factor in these calculations. Any suitable means known in the art for progressive call and response between units may be used in resolving inter-unit distances.

The devices preferably chirp in a predetermined order, as indicated in blocks 803 and 804. Preferably, the device initiating the cue goes first, with the second system following after a predetermined delay. In other embodiments, fixed delays may be predetermined or random delays generated on the spot. While this is illustrated for two devices, the process may be extended to any suitable number of devices by suitably sequencing chirps from additional devices. Delaying different devices' chirps is preferred to avoid cross interference between the sounds as they propagate between devices, however, it is not a strict requirement so long as each device knows the time at which the other device's chirp originated. Moreover, preferred embodiments include pulse coding of the chirps so that they have good auto-correlation properties for detection at a tight time accuracy and good cross-correlation properties to avoid one chirp interfering with another should it (or an echo) overlap with another device's chirp.

The term 'chirp' is used generically herein to describe any emitted sound or ultra-sound from the devices. However, a sound that exploits pulse-compression and other waveform shaping concepts well-known in sonar, radar, and other ranging fields is preferred.

According to block 805, each device listens for the chirps of other(s) and upon detection, locates the chirp in time and compares that time of arrival to the cue time (the time that the system initiated inter-user ranging). After subtracting the known delay between the cue time and the transmit time, each device may thus compute an inter-device TOF. In accordance with the physics of sound, it may compute from the TOF and speed of sound the distance between devices as indicated in block 807.

Preferably, the distance is measured with chirps in both directions and with multiple chirps with varied properties, so as to control for multi-path echoes and other variations that might throw off any single measurement. Measurements are preferably cross thresholded, to determine which correspond to the shortest distances between devices, and those that are closest are averaged to determine a final estimate.

Figure 9:
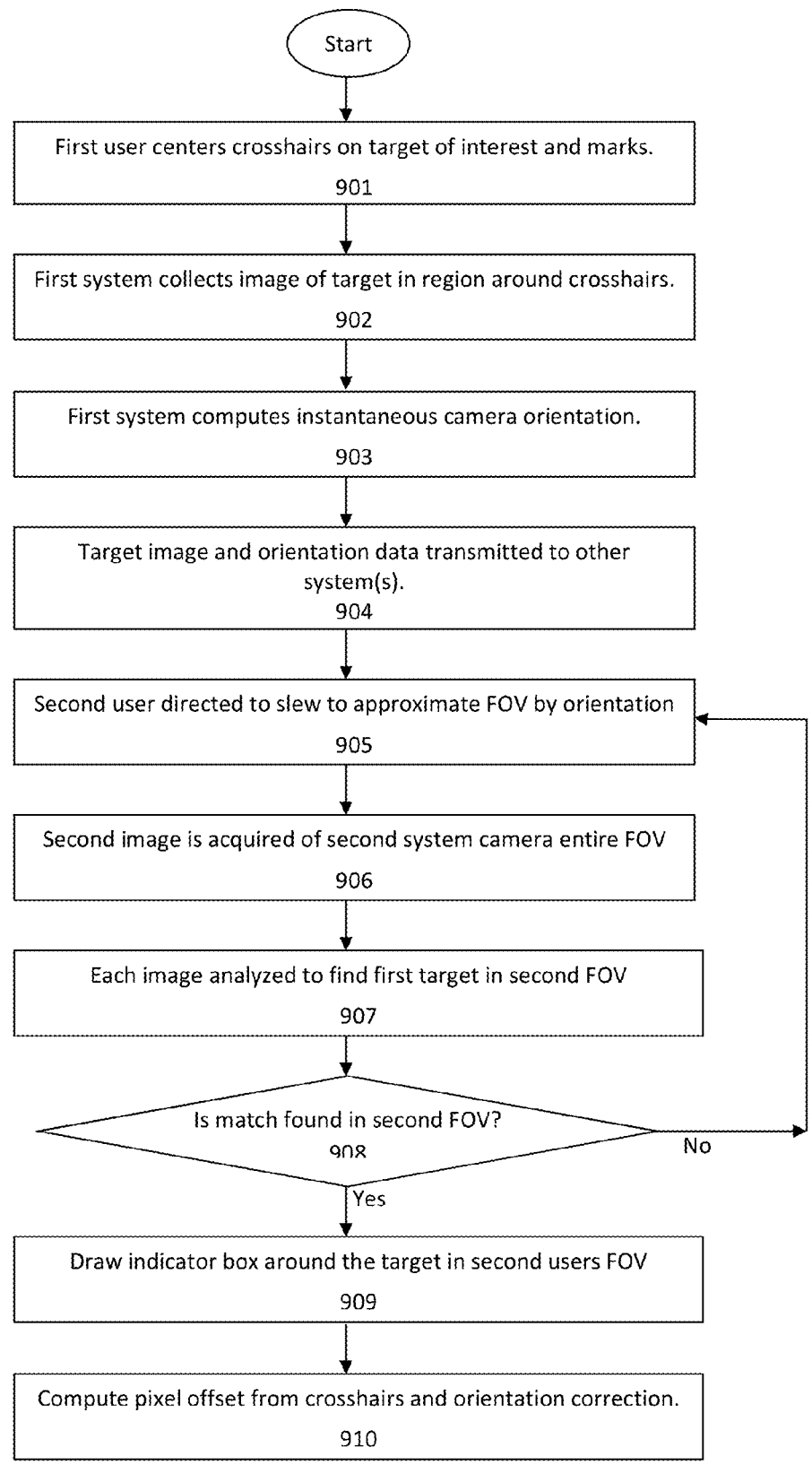
FIG. 9 is a flow chart illustrating a flow of processes for a target selection process carried out by a system formed in accordance with an exemplary embodiment of the present invention.

In accordance with an exemplary embodiment of the present invention, the subject system carries out target selection by a process such as illustrated in FIG. 9. Generally, a first user centers cross hairs of his/her display on a target of interest and activates targeting. Then, the first user's device collects a photograph of the target using the region around the crosshairs and computes the instantaneous orientation of the camera using IMU data. Next, the target image is transmitted to a second system and/or server. The second user is directed to slew to the approximate FOV, and a second image of the entire field is acquired from the second user's camera. Each of the images is preferably analyzed to compute a two scale level difference of Gaussian (DoG) matrix, normalized by local brightness. Thereafter, the RMS cross correlation is taken between the target image DoG and the second image DoG, and the peak is compared to a threshold to determine if the target is found in the second image. If the target is found in the second image, then it is boxed or otherwise indicated visually in the second user's acquired image. The pixel offset from the second users cross hairs is calculated, as is an angle of offset from the present orientation of the user device.

Referring to FIG. 9, the first (or lead) user centers crosshairs on a target of interest and marks this as a target. Marking of a target, as shown in block 901, is preferably achieved by means of a soft button on the user's smartphone interface, but physical buttons, or gesture, eye blink, or body-movement input may be suitably substituted in various alternate embodiments. This activates a recording of data for the target and a linked targeting process. The first user's device collects an image of the target in a predefined region around the crosshairs (block 902), preferably smaller than the entire field of view (FOV) and in some embodiments, adjusted for range of the target. For speed, this is typically a square segment of the image but may be any other predetermined shape or irregular or edged-defined region.

Preferably, concurrent with image collection, the system also computes and stores the instantaneous camera resolution (block 903), in accordance with the capabilities of the IMU/sensor package in the smartphone as discussed herein. This information is used in computing a relative slew offset for the second user (or users.) Any suitable number of users may potentially follow a single lead user who has set a target. Multiple users may quickly exchange roles between fixing targets as lead or follow directions to targets as followers. Target information from one or more users for multiple targets may be recorded simultaneously in certain embodiments. In other embodiments, the information may be stored in memory and recalled at later time. However, for simplicity of explanation an exemplary embodiment described herein focuses on a single user setting a target for the others to find. Steps similar to those illustrated for the single user setting/leading embodiment may be applied to alternate embodiments involving multiple targets and multiple target sources (leaders).

According to block 904, target information, including the orientation reference data and an image reference, is transmitted from the lead user (or other source) to the other devices involved in the orientation tracking. In accordance with an exemplary embodiment of the present invention, the system network is configured to include at least one system to set the target and at least one system to find the target. Generally, these systems are separate units held and operated by two separate users; however, in the case of delayed finding, a single unit may be utilized for setting the target and subsequently locating the target. The network also includes a server unit with higher-processing capability, which is configured to process data on behalf of the handheld, smartphone client units, as illustrated in FIG. 2. The processing capabilities and the manner by which computations are determined are not restricted to a specific configuration. Rather, the system may be configured in any manner suitable to provide a practical system resource distribution that is able to work in real-time using available hardware.

The result of calculations preferably include the target orientation of the lead device relative to a known reference point, the relative displacement of any given second unit from the first, and the relative range of the target itself from the respective devices. Accordingly, in block 905 each secondary (following) device is directed to adjust its orientation so that its camera will be centered on the target of interest. Because errors and drift are normally anticipated, the practical result of this direction is that a user should at least direct the secondary unit's camera so that the target of interest is within its camera's field of view. Thus, the FOV provides a maximum bracket for the initial calculations used to direct the secondary user to the target.

As previously discussed herein and illustrated in FIG. 3, numerous measures are available for guiding a user to the target; however, the preferred mechanism for a handheld sighting unit is to provide visual orientation correction alerts like arrows disposed at the periphery of the camera image showing the necessary direction of orientation slew (adjustment).

According to block 906, in accordance with a preferred embodiment of the present invention, an image of the entire camera FOV is acquired once the secondary user is sufficiently oriented in the general direction of the target. This acquisition may be triggered automatically once the FOV is determined to overlap the target, or alternatively, may be triggered manually by touching a "find" button on the user interface screen. The method of triggering is variable depending upon the computing power available in each specific application.

Next, according to block 907, the secondary image is analyzed to search within it a match to the target reference image. Again, depending upon available hardware this operation may occur locally or may be undertaken by a network linked processing server. In certain embodiments, multiple targets or adjusted images will be queued and processed to enable the aggregation of information over time. For instance, as illustrated in FIG. 2, two or more pointing/imaging devices (each of which may take the role of lead or follower) communicate via a Wi-Fi network hub on which is also configured a processing server. Each PDA style pointing device runs an application that permits users to visualize and interact with the camera view, while the processing server is available for the rapid comparison of images acquired at each respective unit. The PDA devices are capable of performing the image comparisons locally. For more seamless and nearly instantaneous tracking of target reaction times, it may be desirable to utilize a processing server for image comparisons rather than performing the comparisons locally. Other PDA devices, tablets, or other pointing/imaging devices of others do not necessarily require the third server component. In other embodiments, Bluetooth, edge, 3G, or LTE connections or the like may be used in place of Wi-Fi.

The basic operation of finding the refined target location is summarized in decision block 908. As described in preceding paragraphs, the actual comparison in the illustrated embodiment is carried out as follows:

Each image (the target and the secondary FOV capture) is analyzed to compute a multi-scale "difference of Gaussian" (DoG) matrix. For speed, and depending on the pixel resolution and processing hardware, as two levels may be used to form a single matrix. A DoG operation comprises finding the convolution of an image or image segment with a first 2D Gaussian function, finding the convolution of the same image or image segment of a second 2D Gaussian function of different scale than the first, and then subtracting one convolution matrix from the other. Such functions form the basis of SIFT (Scale Invariant Feature Transform) and other image processing operations. The execution of these operations may be rearranged mathematically to achieve the same result in more computationally efficient manner than is achieved by performing these operations individually. Moreover, functions other than a Gaussian, such as for example, a compact wavelet, may be exploited in place of Guassians. Thus, there are numerous substantially equivalent mathematical means to generate the DoG or a DoG type matrix which may be used in systems formed in accordance with alternative embodiments of the subject invention. The DoG matrix is normalized by local brightness in each image, in order to control for lighting angle variations.

Once a lead user acquires a target image, a secondary user acquires a FOV image oriented in a direction in accordance with the best available estimate of the target's relative direction to the second users according to IMU based calculations. This target image is transmitted along with the FOV image user to a common processing platform. Typically, this is the second user's smartphone or a common shared processing server but may be any other device which is able to receive and process the transmitted image.

Each image is reduced to at least two Gaussian blurred renderings at two distinct values of sigma, where sigma is a measure of the radial diffusing effect of the 2-D Gaussian function. Each pair of Gaussian blurred renderings is subtracted to form a DoG. In minimum configuration then, there are two blurred renderings: one DoG for the target image and one for the FOV image. Each DoG in the minimum configuration comprises a 2-D matrix of value similar in size to the original image.

Each DoG is subsequently normalized in accordance with the process previously discussed herein and after normalization, a cross-correlation is performed between the normalized DoG matrices from the target and the FOV image. The peak of this cross-correlation is taken as the most likely candidate for where the target image is located within the FOV image. If this value exceeds a threshold at this peak, a match is declared, otherwise no match is declared.

In the event that a match is declared, the region is boxed in the secondary user's display by a target frame. Its pixel distance from the secondary users' cross-hairs is converted to a vector angle of divergence from the center of the camera, and this angle is used to adjust the secondary user's IMU-based estimate of the targets relative orientation so that the user will be guided to the correct target point by the arrow feedback system with high precision.

Typically, the lead user's view of the target will differ from the secondary user's view, due to rotation, parallax angle, and lighting angle. Thus, the goal of the image processing is not necessarily to find an identically matching image segment, as this is rarely possible. Instead, the goal of the image processing is to discover a constellation of features in the image which match but which may have moved slightly relative to each other. This concept is consistent with SIFT and SURF and other computer vision techniques known in the art.

To complete execution of the comparison in block 908, an RMS cross-correlation is taken between the target image DoG and the secondary FOV image DoG matricies. If the peak exceeds a predetermined threshold, that peak is considered a match for the target image and the peak's location is treated as the location of the target within the secondary FOV image. If the target is not found in a given round of processing, the system continues to utilize the IMU based orientation calculations to direct the secondary user to slew toward the target, as illustrated by the loop back from block 908 to block 905.

If the target is identified within the secondary user's FOV, then according to block 909, the preferred system will draw an indicator box around that target in the video view pane in the secondary user's FOV. Preferably, once this box has been drawn, it is subsequently moved with the image so as to remain over the target point as the user slews his or her sighting device. In addition, according to block 910, the pixel offset from the FOV's center cross hairs to the target is computed, thus providing an orientation correction to the system. The orientation feedback arrows (or other suitable orientation correction alerts) will subsequently respond to this finer-tuned location as their target.

The subject system is preferably equipped with sufficient measures to continually track targets via IMU corrections and cross-check the target via feature matching, thus providing a seamless, high resolution user experience. Alternatively, the system may be modified such that after performing one round of target selection, subsequent operations are enabled only responsive to manual request by a user.

Figure 10:
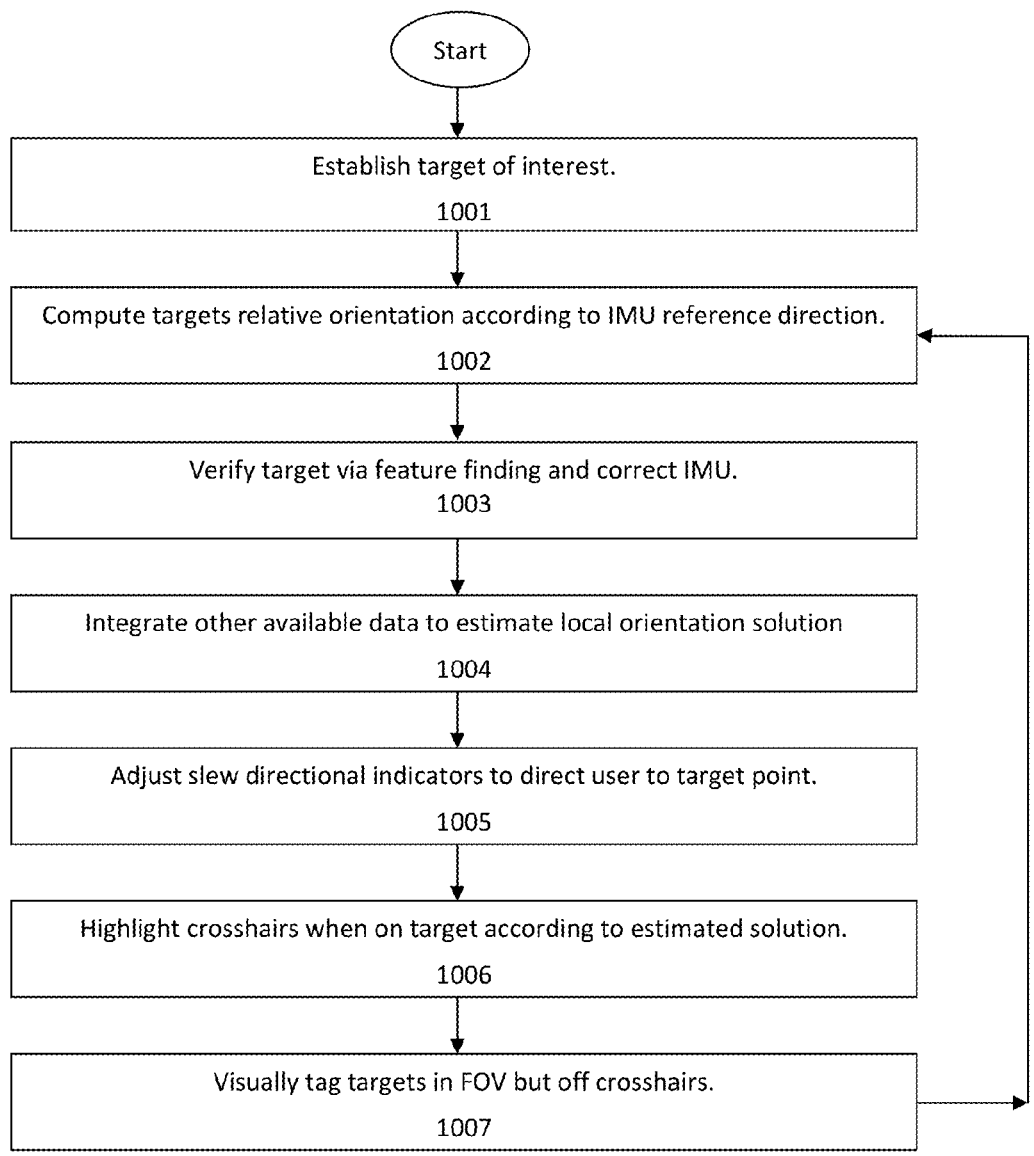
FIG. 10 is a flow chart illustrating a flow of processes for a target tracking process carried out by a system formed in accordance with an exemplary embodiment of the present invention.

In accordance with an exemplary embodiment of the present invention, the subject system carries out target tracking by a process such as illustrated in FIG. 10. Generally, once a target has been identified on either system, each respective user has an orientation available relative to their internal IMU. At each update frame, the difference between present orientation and target orientation is computed and one of four directional arrows are illuminated on the user's screen to indicate adjustments necessary to re-center the target.

More specifically, as shown in block 1001, the first step of target tracking is establishing a target. This may be accomplished by a single user marking a target, a lead user marking a target and sending that information to the other users, by auto-marking of targets based on some predetermined criteria, or by recalling a previously marked target from stored memory. The target is presumed to be described by its orientation (elevation and azimuth) relative to a predetermined position, with additional data preferably including an image or processed feature thereof. Additional absolute geo-location reference information may or may not be included in the target data.

Subsequently, as shown in block 1002, the tracking device (which may be that of the original leader or any secondary follower) computes the target's relative orientation according to the local device's current IMU estimated orientation. Again, this may be estimated relative to absolute references, such as compass heading and angle of elevation relative to the earth, or estimated relative to a previously fixed orientation from which subsequent rotations have been tracked using the IMU. This forms the first estimate of the target's relative location. It is further corrected according to the parallax angles (as described with reference to FIG. 9) so that any separation between the original targeting users and the following users, and the relative distances to the target, are accounted for in computing the estimate orientation of the users' devices relative to the common target.

As illustrated in block 1003, and as described with reference to FIG. 9, if the target is estimated to be within the user's FOV, image feature finding is applied to find the target features within the FOV. If it is found, then this data is used to correct the IMU based target direction estimate, as described.

If additional data is available, such is also fused into improving this estimate (block 1004). FIG. 4 provides some examples. In particular, GPS may be used to check and update the user's position relative to the original predetermined lead user position. As described in preceding paragraphs, acoustic chirps may provide an energy frame reference with which to update the baseline distance between two users. Any other suitable energy frame reference known in the art, such as those based on light ray angles, and the like may be used in certain alternate embodiments.

The use of the features disclosed in blocks 1002-1004 are optional depending upon the particular requirements of an intended application. In other words, systems formed in accordance with the present invention may include any combination of these features.

In block 1005, having arrived at a final best estimate of the target's orientation relative to the current orientation of the user's sighting device, the user is thus directed to slew his or her sighting device toward the correct orientation. One approach for slewing toward the correct orientation has been previously described herein with reference to FIG. 3.

Thereafter, the system optionally removes the slew direction guidance arrows 34 and presents other feedback to the user related to target location. Specifically, once the system has located the target, crosshairs are highlighted as provided in block 1006. In accordance with an exemplary embodiment of the present invention the guidance arrows 34 (as seen in FIG. 3), are removed and an identification circle 38 is flashed around the center target point when the pointer is within a predetermined number of degrees of exact visual coincidence with the target 30.

In the event that the system determines that the user is off-target, but the target appears discernibly in the user's FOV, a visual tag may be placed in the view field to mark the target (as shown in block 1007). Thus, in the example illustrated in FIG. 3, a target frame 32 hovers around the identified target 30 in each of the FOV's shown while the target remains visible in that FOV.

In the simple case of a single target, this target frame 32 helps guide the user to center their sighting device very quickly. In the case where the system is used to mark multiple targets, various informational indicia, including but not limited to color coded markers, may be generated to hover simultaneously around any and all targets of interest.

In accordance with FIG. 10, the tracking operation loop preferably continues (looping from block 1007 to block 1002) until manually discontinued by the user or a new target of interest is established. Preferably, this loop is common to both the lead and secondary devices once a target is established. Thus, the leader's device will help lead its user back to the same target if they slew off target. This is in contrast to other embodiments which may track wherever the leader is pointing as the current target for each iteration.

In accordance with an exemplary embodiment of the present invention, where a match to the first user's target is not found in the second user's field of view during target selection, the subject system carries out the process of IMU target information exchange. The absolute IMU based orientation of the first users device is transmitted to the second user and the baseline distance between devices is used to determine a parallax angle. The second user's device is then directed toward the proper angle to intersect with the first user's view selected target point. Thereafter, the camera focus or other suitably accommodated mechanism is used to estimate the range of the target to enable precise computation. Alternatively, the system may be designed to apply an approximate operating range which gives practical solutions for most working distances.

The system and method disclosed herein will have broad application apparent to those skilled in the art once they have understood the present disclosure. Upon reviewing the novel combinations of elements disclosed in the specification and figures and the teachings herein, it will be clear to those skilled in the art that there are many ways in which the subject system and method may be implemented and applied. The description herein relates to the preferred modes and example embodiments of the invention.

The descriptions herein are intended to illustrate possible implementations of the present invention and are not restrictive. Preferably, the disclosed method steps and system modules/units are wholly or partially programmably implemented in computer based systems known in the art having one or more suitable processors, memory/storage, user interface, and other components or accessories required by the particular application intended. Suitable variations, additional features, and functions within the skill of the art are contemplated, including those due to advances in operational technology. Various modifications other than those mentioned herein may be resorted to without departing from the spirit or scope of the invention. Variations, modifications and alternatives will become apparent to the skilled artisan upon review of this description.

That is, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A method for parallactically synced acquisition of images about a common target from mutually displaced imaging positions, the method comprising:

establishing at least first and second imaging devices respectively at a first and a second of the imaging positions;

actuating said first imaging device to acquire a first image with a target of interest disposed at a predetermined relative position within a field of view thereof;

actuating an orientation sensor to acquire an instantaneous angular orientation measurement of the first imaging device;

transmitting the angular orientation measurement from the first imaging device to the second imaging device to thereby guide preliminary angular adjustment of said second image capture device toward the target of interest;

actuating said second imaging device to acquire a second image with the target of interest disposed within a field of view thereof;

acquiring an angular orientation measurement of the second imaging device when the second image is acquired;

executing in a processor a target feature finder to detect a location of the target of interest within the second image by comparatively processing image features of the first and second images acquired by the first and second imaging devices;

generating a plurality of user prompts at said second imaging device responsive to detection of the location of the target of interest in the second image by the target feature finder to thereby further guide angular adjustment of said second imaging device based on the comparative processing of the image features, the user prompts including:
  visual indicia adaptively applied to the second image to visually distinguish the target of interest, and
  orientation correction alerts adaptively generated to guide angular displacement of said second imaging device to situate the target of interest at the predetermined relative position within the field of view thereof;

actuating a selected one of the first and second imaging devices to acquire at least one subsequent image;

acquiring a subsequent angular orientation measurement of said selected imaging device relative to the known reference point when the subsequent image is acquired;

computing an orientation difference between the subsequent angular orientation measurement and an angular orientation measurement acquired for a previous image acquired by said selected imaging device; and adaptively generating subsequent orientation correction alerts responsive to the orientation difference computation to thereby guide subsequent angular adjustment of said selected imaging device to situate the target of interest at the predetermined relative position within the field of view thereof.

2. The method as recited in claim 1, wherein target of interest data of said first imaging device is transmitted to said second imaging device, said second imaging device being guided to slew in angular orientation toward the target of interest based on the transmitted target of interest data and transmitted instantaneous angular orientation measurement.

3. The method as recited in claim 1, wherein the predetermined relative position for the target of interest is centered within the field of view of an imaging device.

4. The method as recited in claim 1, further comprising inter-device ranging to measure a base line distance between said first and second imaging devices for parallax angle correction thereat with respect to the target of interest, said inter-device ranging including the exchange of at least one cue signal between said first and second imaging devices, said cue signal having a predetermined energy frame reference type.

5. The method as recited in claim 1, wherein the orientation correction alerts include visually displayed directional markers applied to the second image.

6. The method as recited in claim 1, wherein said comparative processing of the first and second images by said target feature finder includes generating scale invariant feature transform (SIFT) image features for comparative matching with the target of interest.

7. The method as recited in claim 1, wherein each of said first and second imaging devices includes a personal communications device selected from the group of consisting of: smartphones, personal digital assistant devices, portable camera devices, and portable entertainment devices.

8. The system as recited in claim 1, wherein:
  the orientation correction alerts include visually displayed directional markers applied to the second image; and
  each of said first and second imaging devices includes a personal communications device selected from the group of consisting of: smartphones, personal digital assistant devices, portable camera devices, and portable entertainment devices.

9. A method for parallactically synced acquisition of images about a common target from mutually displaced imaging positions, the method comprising:
  establishing at least first and second imaging devices respectively at a first and a second of the imaging positions;
  actuating said first imaging device to acquire a first image with a target of interest disposed at a predetermined relative position within a field of view thereof;
  actuating said second imaging device to acquire a second image with the target of interest disposed within a field of view thereof;
  executing in a processor a target feature finder to detect a location of the target of interest within the second image by comparatively processing image features of the first and second images acquired by the first and second imaging devices; and
  generating a plurality of user prompts at said second imaging device responsive to detection of the location of the target of interest in the second image by the target feature finder, the user prompts including:
    visual indicia adaptively applied to the second image to visually distinguish the target of interest, and
    orientation correction alerts adaptively generated to guide angular displacement of said second imaging device to situate the target of interest at the predetermined relative position within the field of view thereof,
  wherein said comparative processing of the first and second images by said target feature finder includes:
    generating a reference Difference of Gaussian (DoG) for at least one portion of the second image and a target DoG for the target of interest,
    cross-correlating the reference and target DoG's for a predefined set of computational scale spaces and octaves,
    summing the cross-correlations generated for each of the computational scale spaces and octaves, and
    determining a maximum value of the summed cross-correlations to represent the most likely image location for the target of interest.

10. A method for automatically guiding visual alignment to maintain coincident fields of view about a common target for images captured from mutually displaced imaging positions, the method comprising:
establishing at least first and second image capture devices respectively at first and second imaging positions;
actuating said first image capture device to capture a first image with a target of interest substantially centered within a field of view thereof;
transmitting target of interest and angular orientation measurement data of said first image capture device to said second image capture device for guiding angular orientation toward the target of interest based thereon;
actuating said second image capture device to capture a second image with the target of interest disposed within a field of view thereof;
acquiring an angular orientation measurement for each of said first and second image capture devices when the first and second images are respectively captured thereby;
executing in a processer a target feature finder to detect a location of the target of interest within the second image by comparatively processing image features of the first and second images captured by the first and second image capture devices; and
adaptively generating a plurality of user prompts at said second image capture device responsive to detection of the location of the target of interest in the second image by the target feature finder, the user prompts including:
predefined visual indicia to identify the target of interest, and
orientation correction alerts to guide angular orientation of said second image capture device to situate the target of interest substantially centered within the field of view thereof, the orientation correction alerts including visually displayed directional markers applied to the second image,
wherein said comparative processing of the first and second images by said target feature finder includes:
generating a reference Difference of Gaussian (DoG) for at least one portion of the second image and a target DoG for the target of interest,
cross-correlating the reference and target DoG's for a predefined set of computational scale spaces and octaves,
summing the cross-correlations generated for each of the computational scale spaces and octaves, and
determining a maximum value of the summed cross-correlations to represent the most likely image location for the target of interest.

11. The method as recited in claim 10, further comprising inter-device ranging to measure a base line distance between said first and second image capture devices for parallax angle correction threat with respect to the target of interest, said inter-device ranging including the exchange of at least one cue signal between said first and second image capture devices, said cue signal having a predetermined energy frame reference type.

12. The method as recited in claim 10, further comprising actuating each of said first and second image capture devices for tracking the target of interest over a series of images subsequently acquired thereby, the tracking including, for each subsequently acquired image:
re-acquiring the angular orientation measurement of said image capture device when the subsequent image is acquired;
computing a difference between the re-acquired angular orientation measurement and the angular orientation measurement acquired for the previous image acquired with the target of interest substantially centered within the device field of view; and
adaptively generating orientation correction alerts responsive to the difference computation for guiding angular displacement of said image capture device to substantially center the target of interest within the field of view thereof.

13. A system for parallactically synced acquisition of images about a common target from mutually displaced imaging positions, the system comprising:
at least first and second imaging devices disposed in displaceable manner at respective first and second imaging positions, said first imaging device acquiring a first image with a target of interest disposed at a predetermined relative position within a field of view thereof, said second imaging device acquiring a second image with the target of interest disposed within a field of view thereof;
at least one orientation sensor collectively acquiring an instantaneous angular orientation measurement of the first and second imaging devices when images are acquired thereby, the angular orientation measurement of the first imaging device transmitted from the first imaging device to the second imaging device to thereby guide preliminary angular adjustment of said second image capture device toward the target of interest;
a target feature finder module detecting a location of the target of interest within at least the second image by comparatively processing image features of the first and second images acquired by the first and second imaging devices; and
an integration module coupled to said target feature finder module, said integration module generating a plurality of user prompts at said second imaging device responsive to detection of the location of the target of interest in the second image by the target feature finder module to thereby further guide angular adjustment of said second imaging device based on the comparative processing of the image features, the user prompts including:
visual indicia adaptively applied to the second image to visually distinguish the target of interest, and
orientation correction alerts adaptively generated to guide angular displacement of said second imaging device to situate the target of interest at the predetermined relative position within the field of view thereof,
wherein, when a selected one of the first and second imaging devices is actuated to acquire at least one subsequent image:
the at least one orientation sensor acquires a subsequent angular orientation measurement of said selected imaging device relative to the known reference point when the subsequent image is acquired,
the integration module actuates computation of an orientation difference between the subsequent angular orientation measurement and an angular orientation measurement acquired for a previous image acquired by said selected imaging device, and
the integration module adaptively generates subsequent orientation correction alerts responsive to the orientation difference computation to thereby guide subsequent angular adjustment of said selected imaging device to situate the target of interest at the predetermined relative position within the field of view thereof.

14. The system as recited in claim 13, wherein said first and second imaging devices each include an orientation sensor, each said orientation sensor including inertial measurement unit acquiring an angular orientation measurement therefor when the first and second images are respectively acquired thereby.

15. The system as recited in claim 14, wherein:
   said first imaging device transmits target of interest data to said second imaging device, said second imaging device being guided to slew in angular orientation toward the target of interest based on the transmitted target of interest data and transmitted instantaneous angular orientation measurement, the predetermined relative position for the target of interest being centered within the field of view of each said imaging device; and
   said first and second imaging devices are actuated to exchange at least one cue signal therebetween for inter-device ranging, the system actuating parallax angle correction for at least one of said first and second imaging devices with respect to the target of interest, said cue signal having a predetermined energy frame reference type.

16. A system for parallactically synced acquisition of images about a common target from mutually displaced imaging positions, the system comprising:
   at least first and second imaging devices disposed in displaceable manner at respective first and second imaging positions, said first imaging device acquiring a first image with a target of interest disposed at a predetermined relative position within a field of view thereof, said second imaging device acquiring a second image with the target of interest disposed within a field of view thereof;
   a target feature finder module detecting a location of the target of interest within at least the second image by comparatively processing image features of the first and second images acquired by the first and second imaging devices; and
   an integration module coupled to said target feature finder module, said integration module generating a plurality of user prompts at said second imaging device responsive to detection of the location of the target of interest in the second image by the target feature finder module, the user prompts including:
      visual indicia adaptively applied to the second image to visually distinguish the target of interest, and
      orientation correction alerts adaptively generated to guide angular displacement of said second imaging device to situate the target of interest at the predetermined relative position within the field of view thereof,
   wherein said comparative processing of the first and second images by said target feature finder module includes:
      generating a reference Difference of Gaussian (DoG) for at least one portion of the second image and a target DoG for the target of interest,
      cross-correlating the reference and target DoG's for a predefined set of computational scale spaces and octaves,
      summing the cross-correlations generated for each of the computational scale spaces and octaves, and
      determining a maximum value of the summed cross-correlations to represent the most likely image location for the target of interest.

* * * * *